United States Patent
Peterson

[15] 3,695,241
[45] Oct. 3, 1972

[54] VALVE SHOCK DAMPENER

[72] Inventor: Rex W. Peterson, 11591 Davenport Road, Los Alamitos, Calif. 90720

[22] Filed: June 8, 1970

[21] Appl. No.: 44,211

[52] U.S. Cl. .........123/90.45, 123/90.46, 123/90.47, 123/90.49, 123/90.19
[51] Int. Cl. .............F01l 1/18, F01l 1/20, F01l 1/24
[58] Field of Search..123/90.45, 90.46, 90.47, 90.49, 123/90.55, 90.56, 90.58, 90.59, 90.19

[56] References Cited

UNITED STATES PATENTS

| | | | |
|---|---|---|---|
| 2,404,241 | 7/1946 | MacMillan | 123/90.46 |
| 2,411,650 | 11/1946 | Burkhardt | 123/90.45 |
| 3,140,698 | 7/1964 | Voorhies | 123/90.46 |
| 3,024,775 | 3/1962 | Wuest | 123/90.47 X |
| 2,669,228 | 2/1954 | Bergmann | 123/90.47 |
| 2,036,936 | 4/1936 | Halford | 123/90.46 |
| 1,494,923 | 5/1924 | Lavoie | 123/90.47 |
| 2,434,386 | 1/1948 | Bradshaw | 123/90.46 |
| 1,784,767 | 12/1930 | Summers | 123/90.46 X |
| 2,438,631 | 3/1948 | Bergmann | 123/90.59 |

FOREIGN PATENTS OR APPLICATIONS

| | | | |
|---|---|---|---|
| 299,565 | 11/1928 | Great Britain | 123/90 H |
| 893,092 | 4/1962 | Great Britain | 123/90 H |

Primary Examiner—Al Lawrence Smith
Attorney—Fulwider, Patton, Rieber, Lee & Utecht

[57] ABSTRACT

A valve chock dampener for installation at one end of a rocker arm in a linkage for controlling opening and closing of a valve in an internal combustion engine. The dampener includes a housing formed with an open ended piston-receiving chamber and a piston is slidably received in such chamber and is formed with a head end for engaging an adjacent control member for controlling the valve.

7 Claims, 5 Drawing Figures

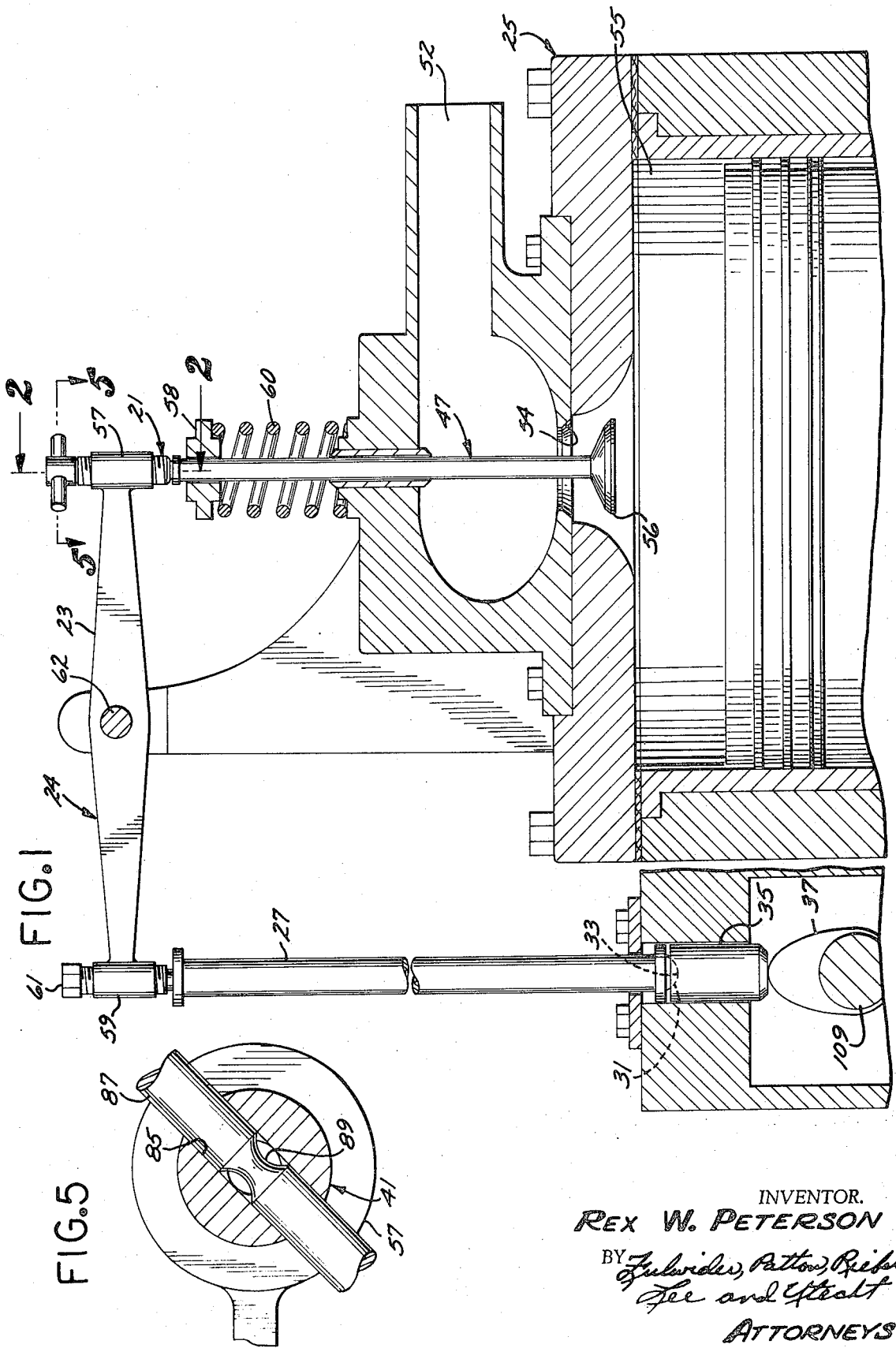

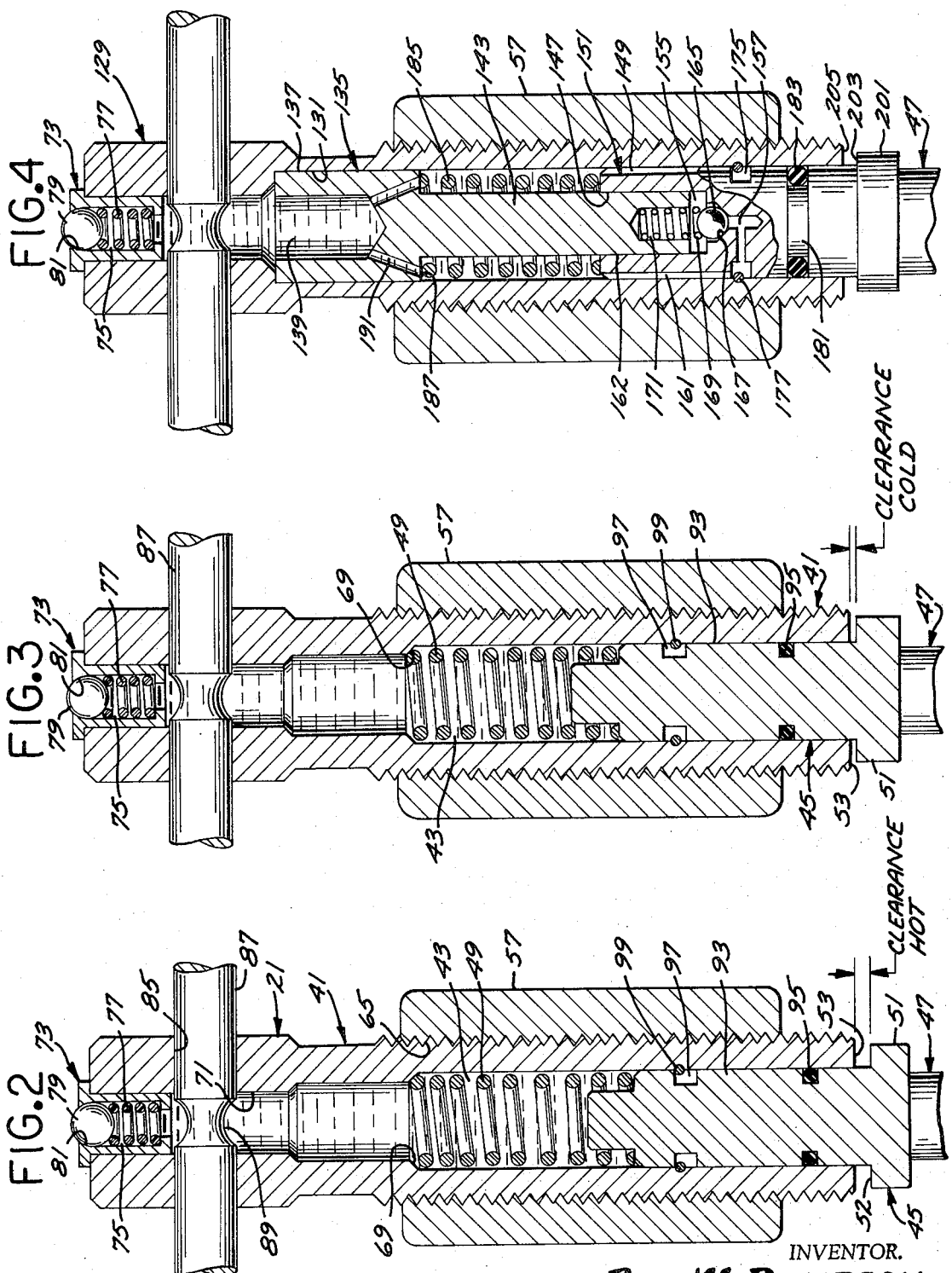

VALVE SHOCK DAMPENER

BACKGROUND OF THE INVENTION

1. Field of the Invention:

The present invention relates to a shock dampening device for installation in the valve control linkages of heavy duty internal combustion engines to dampen the shock experienced during reciprocation of such linkages to control the valve.

2. Description of the Prior Art:

Internal combustion engines normally employ valves for admitting fuel to the piston chambers and such valves are biased to their closed position by valve springs. A valve control linkage is frequently driven by cams to act on the valves to overcome the bias of such valve springs to open the valves at selected intervals during the cycle of engine operation. However, because of the thermal expansion of the engine block a selected amount of valve clearance must be provided thereby resulting in a certain amount of play in the linkage which results in high impact between parts upon reciprocation of such linkage during control of the valve. This is particularly true in the case of heavy duty engines which employ relatively massive control linkages and operate at high RPMs and the problem is compounded by the fact that such linkages frequently employ a ball and socket joint and the repeated impact results in the ball and socket joints being hammered out thereby decreasing the degree of valve opening and resulting in non-uniform opening from revolution to revolution.

Valve control linkages have been proposed which incorporate springs for providing gradual application of opening force to the stem of a valve. A device of this kind is shown in U.S. Pat. No. 1,866,293. However, such devices suffer the shortcoming that the springs are of insufficient strength to withstand the heavy loads created at high RPMs for heavy duty engines. Applicant is unaware of any prior art self-contained shock dampeners which employ a piston biased to an extended position in a housing for maintaining the various joints in the valve control linkage biased together to thereby prevent spacing in such joints which results in excessive shock when engaging members are brought together upon reciprocation during each engine revolution.

SUMMARY OF THE INVENTION

The present invention is characterized by a housing carried at one end of the rocker arm of an internal combustion engine and formed with an open ended chamber which receives a piston. Biasing means is disposed in the chamber for maintaining the piston biased outwardly into engagement with the valve stem with sufficient force to maintain the joints in the valve control linkage biased together during reciprocation of the linkage and to enable the valve spring to overcome such force and drive said piston back in said housing on each down stroke of said valve. Abuttment means is provided in spaced apart relationship on the housing and on the piston for engagement to limit telescoping of the piston in the housing to overcome the valve spring bias and open the valve on each revolution of the engine.

An object of the present invention is to provide a valve shock dampener of the type described which is relatively light, self-contained, and readily installable in a standard internal combustion engine.

Another object of the present invention is to provide a shock dampener of the type described which can be employed for setting the valve clearance.

Still another object of the present invention is to provide a valve shock dampener of the type described which is self-lubricating.

A further object of the present invention is to provide a valve shock dampener of the type described which provides for automatic take-up of clearances resulting from thermal expansion of the engine block.

These and other objects and the advantages of the present invention will become apparent from a consideration of the following detailed description when taken in conjunction with the accompanying drawings.

DESCRIPTION OF THE DRAWINGS

FIG. 1 is a vertical sectional view of a heavy duty engine having a valve shock dampener of present invention installed therein;

FIGS. 2 and 3 are vertical sectional views, in enlarged scale, taken along the lines 2—2 of FIG. 1 and showing the shock dampener in two different positions;

FIG. 4 is a vertical sectional view similar to FIG. 2 of a second embodiment of the vale shock dampener of present invention; and FIG. 5 is a horizontal sectional view, in enlarged scale, taken along the lines 5-5 of FIG. 1.

DESCRIPTION OF THE PREFERRED EMBODIMENT

Referring to FIG. 1, generally, the shock dampener 21 of present invention may be installed on the valve end of a rocker arm 23 included in the valve control linkage of a heavy duty internal combustion engine 25. Engines of this type frequently include relatively massive push rods 27 which are formed on their lower extremities with balls 31 received in sockets 33 of a slider 35 which is driven by a drive cam 37. The valve shock dampener 21 includes a housing, generally designated 41, which is formed with a downwardly opening chamber 43 which receives a piston, generally designated 45, that is biased downwardly into engagement with the upper end of a conventional valve, generally designated 47, by means of a coil spring 49. The lower extremity of the piston 45 is formed with an enlarged head 51 which abuts the lower end 53 of the housing 41 to limit telescoping of such piston upwardly into the chamber 43 whereby such piston is maintained biased downwardly to maintain the valve control linkage 24 under constant bias to maintain the ball 31 biased firmly into the socket 33 during reciprocation of the valve control linkage to thereby avoid separation thereof which would cause such ball and socket to be hammered against one another upon re-engagement thereof thereby causing excess wear and making close adjustment and control of the valve opening impossible.

Heavy duty engines 25 generally operate on natural gas and frequently have relatively large cylinder bores 55 which may be twelve inches in diameter and the rocker arms 23 may be 18 inches long and the push rods 27 46 inches long. Consequently, the overall size and mass of the equipment creates substantial shock problems during reciprocation of the relatively massive linkage 24. The upper end of the cylinder bore 55 includes a valve seat 54 for communicating flow of natural gas from an inlet manifold 52 and upon which the valve poppet 56 of the valve 47 seats. Secured to the upper extremity of the valve stem is a spring retainer 58 against which the upper end of a conventional valve spring 60 seats.

The rocker arm 23 includes bosses 57 and 59 on its opposite ends which are formed with through vertical bores that are internally threaded for receipt of externally threaded adjustment studs, such as the adjustment stud 61 mounted in the boss 59.

Referring to FIG. 2, the housing 41 is in the form of a cylindrical bolt which is exteriorially threaded for receipt in an internally threaded bore 65 formed in the rocker arm boss 57. A bore projects vertically upwardly from the bottom end of the housing 41 to form the piston chamber 43 and is then reduced in diameter to form an internal shoulder 69 against which the upper end of the piston biasing spring 49 abutts. The upper end of the vertical bore is again reduced in diameter to form an oil inlet bore 71 that receives a tight fit check valve insert, generally designated 73, in its upper extremity.

The check valve insert 73 is formed with a through vertical passage 75 which receives a coil compression spring 77 therein for biasing a check ball 79 upwardly into engagement with a valve seat 81 formed in the upper extremity thereof.

A transverse bore 85 is drilled through the upper extremity of the housing 41 and receives a cross rod 87 which forms an adjustment handle. The cross rod 87 is formed with a reduced-in-diameter portion 89 for passage of oil thereby.

Still referring to FIG. 2, the piston 45 is formed with an upwardly projecting straight shank 93 which has a peripheral O-ring groove formed in the lower extremity thereof for receipt of an O-ring 95. A snap ring groove 97 is formed in the piston shank 93 for receipt of a snap ring 99 which is snapped into a peripheral groove formed in the wall of the housing 41 to hold the piston 35 captive in the housing or barrel 41.

It is noted that the overall size of the shock dampener 21 is only ½ inch in diameter and 3 inches in length whereby very little, if any, weight is added to the valve control linkage 24 thereby.

In operation, the valve shock dampener 21 of present invention may be installed in a heavy engine 25 by merely removing the conventional set stud normally screwed into the boss 57 for adjusting the valve 47 and screwing the shock dampener 21 into position. If desirable, a lock nut may be screwed onto the threaded portion of the housing 41 to lock said housing into position relative to the rocker arm 23. The valve clearance is determined by the distance between the top shoulder of the piston head 51 and the bottom end 53 of the housing 41 when the drive cam 37 (FIG. 1) is projecting downwardly and the poppet 56 of the valve 47 is seated on the valve seat 54. It is suggested that this valve clearance be set at .010 inches when the engine is cold. Oil is inserted in the piston spring chamber 43 by depressing the check ball 79 and dropping approximately 40 drops of SAE twenty or thirty weight oil therein for lubrication and dampening vibration of the piston spring 49. Approximately four to 6 drops of such oil will seep downwardly past the O-ring 95 each month so oil should be added periodically.

When the engine 25 is started, the cam shaft 109 will rotate the cam 37 to drive the valve control linkage 24 to reciprocate the rocker arm 23 causing the dampener 21 to be moved downwardly against the bias of the valve spring 60 and causing the piston 45 to be forced upwardly against the bias of the piston spring 49 until the shoulder of the piston head 51 engages the lower end 53 of the housing 41 to thereby overcome the bias of the valve spring 60 and open the valve 47 a selected amount to enable pressurized natural gas to enter the cylinder chamber 55 from the inlet 52. In a representative installation the piston spring has a spring coefficient of 24 pounds per inch and the valve spring 60 has a spring constant of 130 pounds per inch.

During the upstroke of the valve 47 the valve poppet 56 will seat on the valve seat 54 and the shock dampener 21 will continue its upward movement thereby enabling the piston spring 49 to bias the piston 45 downwardly to maintain contact with the upper end of the stem of the valve 47 to maintain the right hand end of the rocker arm 23 biased upwardly to bias the left hand end thereof downwardly and maintain the set stud 61 pressed downwardly against the push rod 27 to maintain the ball 31 biased firmly in the ball socket 33 thereby preventing separation between such ball and socket. Consequently, as the cam 37 commences driving the slider 35 upwardly, the ball 31 will already be in firm contact with the ball socket 33 thereby avoiding such ball and socket being hammered together resulting in deformation and excessive wear.

The foregoing procedure will be repeated during each revolution of the engine 25 and as such engine heats up, the engine block will expand thereby moving the valve seat 54 and rocker arm mounting pin 62 upwardly relative to the cam shaft 109. Consequently, the push rod 27 will not maintain the rocker arm 23 pivoted as far clockwise as when the engine was cold and at the end of each upstroke of the right hand end of the rocker arm the piston 45 will be telescoped further out of the housing 53 to maintain tension on the entire valve drive linkage 24 to assure that the ball 31 and socket 33 do not separate and then hammer back together.

It will be clear that with the dampener 21, the valve clearance defined between the piston shoulder 52 and end of he housing 53 may be set relatively large to assure that the piston 45 telescopes sufficiently far into the housing 53 to enable the valve 47 to close fully while the engine is cold. Further, while the engine is cold the piston spring 49 biases the piston 45 downwardly with sufficient force to maintain the housing 53 biased upwardly and the rocker arm 23 rocked counterclockwise with sufficient force to maintain the ball 31 seated in the socket 33 during downward travel of the slider 35.

The combination shock dampener and compensator, generally designated 129, shown in FIG. 4, is similar to the shock dampener shown in FIG. 1 and includes a barrel which is externally threaded for receipt in a rocker arm boss 57.

The shock dampener 129 is formed with a downwardly opening bore 131 which has a plunger device, generally designated 135, telescoped thereto. The plunger device 135 is formed on its upper end with an enlarged base 137 having a downwardly projecting bore 139 therein for defining a hydraulic fluid reservoir. The plunger device 135 includes a reduced-in-diameter plunger 143 projecting downwardly from the base 137 and telescopically received in an upwardly opening bore 147 formed in a barrel defined by the shank 149 of a piston, generally designated 151, and the lower end of the plunger 143 cooperates with the lower extremity of the piston bore 147 to define a take-up hydraulic fluid chamber 155 which has fluid supplied thereto through a fluid passage 157 projecting downwardly therefrom and turning radially outwardly to communicate with an annular passage 161 formed between the periphery of the upper part of the piston shank 149 and the bore 131 of the barrel. The plunger 143 closely fits the piston bore 147 to define a relatively small annular bleed passage 162 for controlled escape of hydraulic fluid from the reservoir 155.

Fluid flow from the fluid take-up chamber 155 is controlled by a check valve ball 165 which is biased downwardly into engagement with a check valve seat 167 in the piston 151 by means of a compression spring 169 which projects upwardly into a downwardly opening bore 171 formed in the lower extremity of the plunger 143. The piston shank 149 is formed with a peripheral retainer groove 175 for receipt of a snap ring 177 snapped into a groove formed in the barrel 131 of the adapter housing to retain the piston 151 in the housing. The piston shank 149 is also formed with an annular O-ring groove 181 for receipt of an O-ring 183 which seals the hydraulic fluid in the reservoir 139.

The piston 151 is biased downwardly by means of a biasing spring 185 coiled around the plunger 143 and abutted on its top end against a shoulder 187 formed by the plunger base 137. A plurality of angularly extending bores 191 lead from the fluid reservoir 139 to the annular chamber formed between the plunger 143 and housing barrel for communicating hydraulic fluid to such chamber and to the annular passage 161 leading to the inlet passage 157 to the take-up chamber 155.

The lower extremity of the piston 151 is formed with a piston head 201 that defines an upwardly facing shoulder 203 for engagement with the lower end 205 of the adapter housing to thereby positively limit upward movement of such piston.

The shock dampener 129 shown in FIG. 4 operates similar to the shock dampener 21 except that when the engine 25 is cold and the control cam 37 is in its downward position, the piston 151 will be biased to its full downward position by the piston spring 185 to telescope such piston downwardly on the plunger 143 to pull a partial vacuum in the take-up chamber 155 thereby enabling the atmospheric pressure on the fluid in the fluid reservoir 139 to force such fluid downwardly through the passages 191, annular passage 161 and in through the inlet passage 157 to raise the check ball 155 off the seat 157 against the bias of the check valve spring 169 to fill the take-up chamber 155 formed at the bottom end of the plunger 143.

As the control cam 37 rotates upwardly to drive the right hand end of the rocker arm 23 downwardly, the dampener 129 will be moved downwardly to move the plunger 143 downwardly against the hydraulic fluid in the take-up chamber 155. The check ball 165 blocks such fluid from escaping to the inlet passage 157 and only a relatively minor amount of such fluid escapes upwardly through the annular bleed passage 162 formed between the plunger 143 and piston bore 147. Consequently, separation of the ball 31 from the socket 33 is prevented and opening of the valve 47 is initiated as soon as the right hand end of the rocker arm 23 commences its downward stroke.

On the upstroke of the right hand end of the rocker arm 23, the shock dampener 129 will be raised sufficiently to enable the bias of the piston spring 185 to urge the piston 151 downwardly to take up any space formed between the lower end thereof and the top of the valve stem to thereby again create a partial vacuum in the take-up chamber 155 to draw any additional hydraulic fluid past the check valve 165 which is required to replace any fluid that escaped through the bleed passage 162 on the previous downstroke.

As the engine 25 heats up and expands, the rocker arm mounting pin 62 and the valve seat 54 will be raised relative to the cam 37 thereby increasing the distance the right hand end of the rocker arm 23 will be raised above the valve seat 24 while the valve 47 is seated, thereby enabling the spring 185 to telescope the piston 151 further downwardly against the top end of such valve to draw greater quantities of fluid past the ball 65 and into the take-up chamber 145. Again, on the downstroke of the right hand end of the rocker arm 23 the check ball 151 will retain the fluid trapped in the take-up chamber 155 thereby maintaining a firm metal-to-metal contact throughout the joints in the valve control chain 24 and, particularly, between the ball 31 and the socket 33.

From the foregoing detailed description it will be apparent that the valve shock dampener of present invention is a self-contained unit which may be conveniently installed in a heavy duty engine and will provide a long and maintenance free life. The shock dampener maintains firm metal-to-metal contact throughout the joints in the valve control linkage to prevent hammering together thereof which would result in erratic valve opening and closing and hammering of the socket and cause the ball to make contact therewith at different points on subsequent strokes resulting in various degrees of valve opening and rendering it impossible to set the valve clearance for proper engine operation. Further, the shock dampener of present invention is relatively small in size thereby enabling installation thereof in the valve control linkage of existing heavy duty engines without upsetting the balance thereof and sugnificantly adding to the inertia thereof. Additionally, in case of failure, the adapter may quickly be removed and replaced by a conventional set stud thereby reducing down time for the engine.

Various modifications and changes may be made with regard to the foregoing detailed description without departing from the spirit of the invention.

I claim:

1. A self-lubricating shock dampener for installation in the valve control linkage of a heavy duty internal combustion engine that has a predetermined valve clearance and of the type that includes an unlubricated and freely partable control linkage having a rocker arm engaging the adjacent end of the valve control member, said dampener comprising:

a housing formed with an open ended piston-receiving chamber and first abutment means;

means for mounting said housing on one end of said rocker arm adjacent said valve control member;

a piston received in the open end of said chamber and formed with a head end for engaging said one end of said valve control member and with second abutment means normally spaced from said first abutment means a distance corresponding to said predetermined valve clearance said piston cooperating with said housing to form a lubrication-receiving chamber having a fluid inlet for receipt of a lubricant;

seal means for sealing said piston with respect to said housing to seal lubrication in said lubrication-receiving chamber;

valve means for normally closing said inlet;

bias means in said piston-receiving chamber for biasing said piston outwardly into engagement with said valve control member with sufficient force to maintain the freely partable links in said linkage biased together to dampen the shock resulting from reciprocation of said linkage during operation of said valve.

2. A shock dampener as set forth in claim 1 wherein:

said housing is formed with a hydraulic fluid reservoir and includes plunger means;

said piston is formed with an open ended barrel telescoped over said plunger means to cooperate therewith to form a take-up chamber at the front of said plunger means and a relatively small bleed passage leading from said take-up chamber to said reservoir, said piston, further, including an inlet passage leading from said reservoir to said take-up chamber; and said dampener includes check valve means for permitting fluid flow through said inlet passage from said reservoir to said take-up chamber whereby said biasing means will maintain said piston extended when said valve is closed to cause said fluid to be drawn through said inlet passage past said check valve means to maintain said take-up chamber filled sufficiently to restrict telescoping of said piston on said plunger means during the subsequent valve opening stroke of said rocker arm.

3. A shock dampener as set forth in claim 2 wherein:

said plunger means is formed to closely fit said barrel and cooperate therewith to form said bleed passage.

4. A shock dampener as set forth in claim 1 wherein said rocker arm is formed on said one end with a threaded bore and wherein:

said housing is externally threaded for being screwed in said boss.

5. A shock dampener as set forth in claim 4 wherein:

said housing is formed with one extremity defining said first abuttment means; and said piston is formed with a head having a shoulder defining said second abuttment means.

6. A shock dampener as set forth in claim 1 wherein said valve is biased to its closed position with a predetermined force and wherein:

said biasing means biases said piston to its extended position with a force having a magnitude of approximately 20 per cent of said predetermined force.

7. A shock dampener as set forth in claim 1 wherein said rocker arm is formed on its valve end with an internally threaded bore disposed in alignment with the stem of said valve and wherein:

said housing is externally threaded for being screwed into said internally threaded bore.

* * * * *